Patented July 17, 1923.

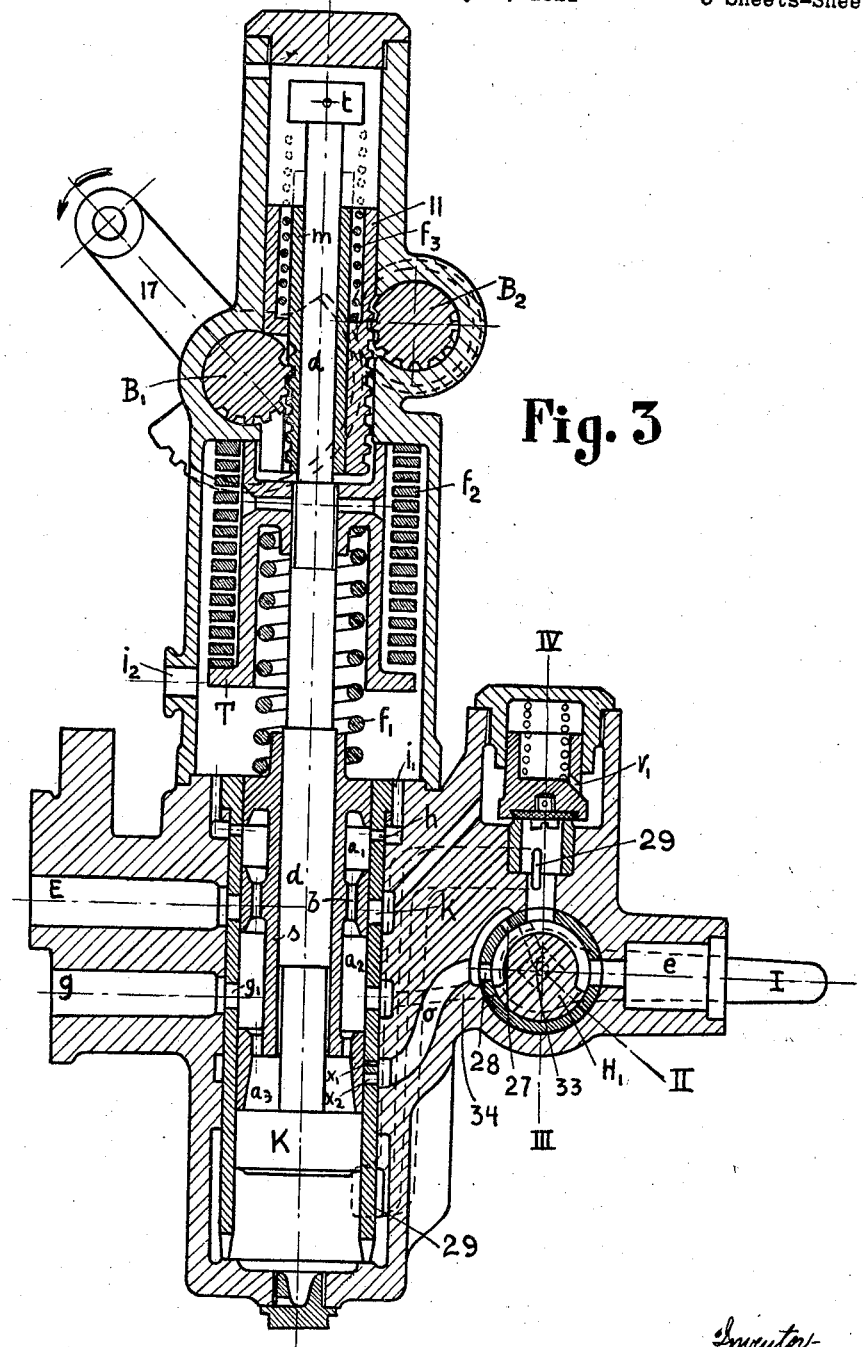

1,462,229

UNITED STATES PATENT OFFICE.

IVAR DROLSHAMMER, OF HAMAR, NORWAY.

PNEUMATIC BRAKE.

Application filed May 5, 1921. Serial No. 467,146.

*To all whom it may concern:*

Be it known that I, IVAR DROLSHAMMER, Hamar, Norway, have invented certain new and useful Improvements in Pneumatic Brakes, of which the following is a specification.

A known device in connection with pneumatic brakes having a piston which is subjected to the pressure of the main and of the brake chamber and a spring, and having also a slide valve subject to the pressure of the brake and of a spring, is to arrange that on reduction of pressure in the main the piston opens a supplementary chamber for admission of air thereto from the main, the object being to secure an efficient and uniform brake effect. On further increase of brake pressure this supplementary chamber does not function because it is filled with compressed air, which is not discharged till the brake is fully released again.

According to this invention the supplementary chamber is arranged in the valve, and not in the piston, and is always fully effective. When by reduction of pressure in the main pipe a certain brake effect is produced, the supplementary chamber functions automatically, but is at once cut out again, so that it functions again at every further increase of brake effect. Moreover, the invention is adapted for rapid and uniform braking by the action of the valve alone, without the supplementary chamber, the action being, alternatively, gradual for ordinary routine work, and rapid for emergency purposes. Further, the invention provides for regulation of the rate of the brake action according to the length of the train, by manual adjustment of a regulating and stop cock and for taking off the brake with discharge of the air in the brake cylinder and in the auxiliary air container, or with retention of the air in the auxiliary container.

With this invention, adjustments of the brake for trucks with different loads, and for express trains, passenger trains and goods trains, can be effected in a manner which disposes of various difficulties and disadvantages of prior devices of this class, as will be made clear in the following detailed description.

The invention is illustrated in the accompanying drawings, in which:—

Fig. 3 is a sectional view of a valve according to Fig. 2, the latter cock being dispensed with, the construction showing a suitable arrangement for limiting the stroke of the distributing slide to different degrees according to the different conditions of acting of the valve.

The apparatus comprises a piston K with rod $d$, having a spring box T attached thereto. Mounted on the rod $d$ is a slide valve $s$, having channels $a^1$, $a^2$, $a^3$. A spring $f^2$ balances the fluid pressure on the piston K. The casing D has an inlet port $e$, a union $g$ leading to the brake cylinder, a union E leading to an auxiliary arc container, a discharge port $i^2$, a supply port $k$, discharge ports $h$ and $i^1$, a stop cock H′, a regulating cock H³, a non-return valve V, and a stop $m$ for the piston K, this stop being a racked sleeve, which meshes with a spindle B, having two pinions of different diameters, and is within a racked sleeve 11 meshing with a pinion B²; the latter meshes with the larger pinion of the spindle B¹, which is actuable by a lever arm 17.

The action of the device is similar to that of the device described in U. S. Patent No. 1,401,325 in that any given pressure in the main supply conduit produces a particular pressure in the brake cylinder.

Figure 1:
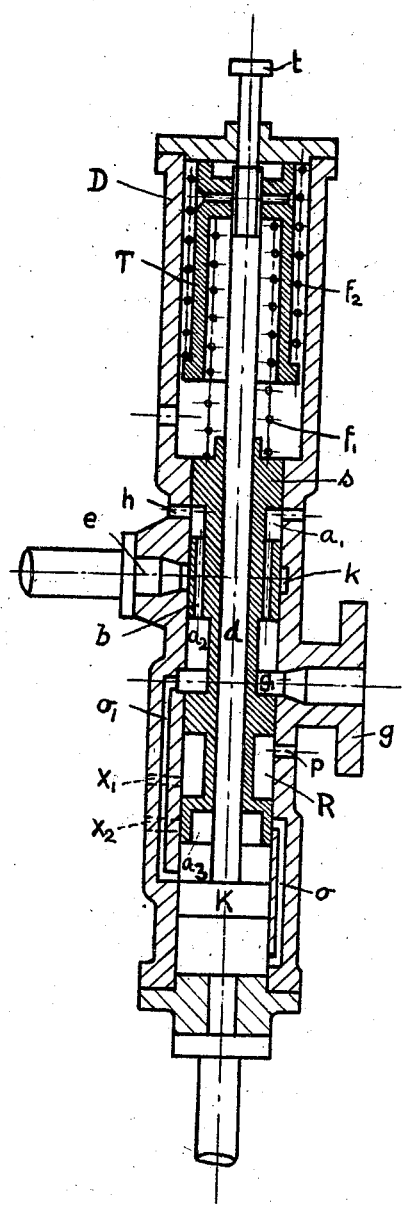
Fig. 1 is a sectional view of an automatic valve for distributing air to the brake cylinder in a train-brake according to the present invention, having a supplementary chamber for admission of air from the main.

Reduction of pressure in the main conduit allows the piston K (Fig. 1) to be thrust downwards by the spring $f^2$ whereby the spring $f^1$ is compressed, and the valve $s$ is moved downwards to close the discharge port $h$ and open the supply port $k$, so that compressed air flows through passage $a^1$, channels $b$, passage $a^2$, and channel $g^1$, to the brake cylinder, and also through channel $o^1$ to the space $a^3$ between the valve $s$ and piston K. At the same time the valve $s$ closes the port $p$ and opens the channel $o$, so that air from the main conduit can flow to the chamber R. If there is no further reduction of pressure in the main conduit the piston K stops, and air can only flow to the brake cylinder till the axial pressure on the valve equals the thrust of the spring $f^1$ and moves the valve $s$ back to closed position. The valve $s$ then closes the channel $o$ again and opens the discharge port $p$, so that the air escapes from the chamber R. If a further increase of the brake effect is produced by reduction of pressure in the main conduit, the cutting in and out of the supplementary chamber R is repeated. This supplementary chamber thus serves to secure uniform and rapid brake action throughout the train.

For alternative slow and rapid application of the brakes the casing of the valve has a small aperture $x^1$ and a large aperture $x^2$. If the pressure in the main pipe is gradually reduced, the opening of the inlet port $o$ by the valve $s$, admits air from the main to the chamber R, whence it flows through the aperture $x^1$, into the atmosphere, or into the brake cylinder if the apertures $x^1$ and $x^2$ communicate therewith. But if the pressure in the main is quickly reduced the valve $s$ moves so far that air from the main can escape through both apertures $x^1$ and $x^2$ into the atmosphere or into the brake cylinder, and a very sudden reduction of pressure is effected. The chamber R always discharges through the small aperture $x^1$. According to Fig. 2 the chamber R is dispensed with. When the slide $s$ according to this construction opens for the channel $o$ the pressure fluid may pass from the latter, either through the narrow inlet opening $x^1$ or through the narrow inlet opening as well as the greater inlet opening $x^2$ to the brake cylinder, the slide being for this purpose provided with suitable axial openings.

It is clear that the requirements to the apparatus are very different, either the train is long or short, especially as to the accelerated brake action. For this reason it may often be desirable to regulate the apparatus or cut it out by hand, according to the actual conditions. A suitable construction adapted for this purpose is illustrated in Fig. 3, according to which the inlet is provided with a cock, by the adjusting of which a passage adapted to the special conditions may be obtained. As an example, it may be mentioned that the braking speed, if the train contains only a few wagons should be slower than if the train should contain many wagons. In short trains it may be desirable to avoid any accelerated braking action or limit the same to a certain degree. Further, the braking force in a goods train should be obtained more slowly than in a passenger train. This is necessary in order to obtain a suitable slow braking action in goods-trains provided with usual loose couplings instead of more modern and rigid couplings as those used in passenger and express trains. This is a fact common to all railway brakes. It should be also mentioned that a greater braking force is necessary when the wagons are fully loaded than is the case when the wagons are empty or half loaded. The regulation may take place by means of a handle shown in Fig. 3 in position I. In this position the pressure fluid may pass from the inlet $e$ to two ports, that is to say, a great port 28, as well as a narrow one 27, to the distributing slide and from this to the brake cylinder through outlet $g$. By this adjusting a very accelerated braking action may be obtained. When the handle takes up the position II the air will only pass through the narrow port 27, and a considerably slower accelerated braking will be obtained. When the handle takes up the position III both ports 27 and 28 will be closed, and no accelerated braking action will be obtained. When the handle takes up the position IV air will be discharged from the brake cylinder, as well as the auxiliary air chamber, through channels 34, 33, along the axis of the cock into the atmosphere releasing the brake. The auxiliary container may be filled from the main through a non-return valve arranged in the housing of the described regulating cock. In order that compressed air above the non-return valve should not prevent lifting of the same, a passage $V^1$ is arranged by means of which the air from the chamber of the spring may freely pass out from the same when the valve is being lifted. 29 designates a channel leading to the lower side of the piston K; when the cock H, takes up the positions marked with I, II, III, compressed air from the inlet $e$ will freely pass through the channel 29 and expose the piston K to the pressure of the compressed air.

Figure 2:
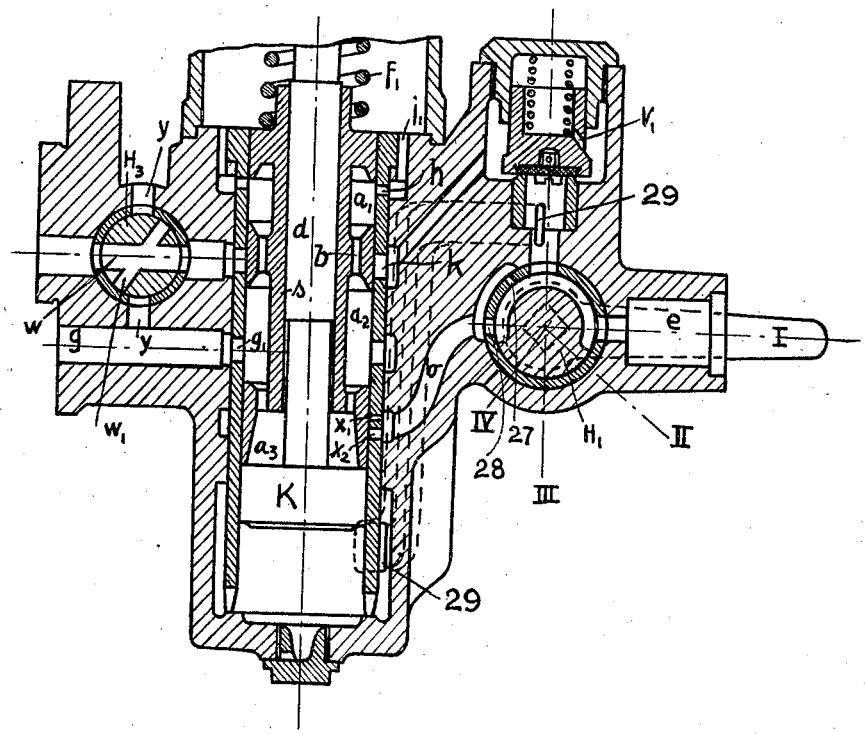
Fig. 2 is a sectional view of one part of a modified construction provided with regulating cock in the inlet of the air and another regulating cock in the outlet by means of which the air after having passed the valve may be directed either to an auxiliary air container or to the atmosphere.

Fig. 2 shows the cock so designed that on release of the brake the air in the auxiliary air container is retained, which is of importance where coaches or trucks are disconnected from one train and added to another, as their auxiliary containers need not be re-charged. It also enables the brake to be used in shunting, for braking individual trucks or coaches, as the brake can be put on and off by turning the cock. The plug $H^3$ of the cock has a large passage $w$, and a narrower passage $w^1$, and the shell has a port $y$ connecting the brake cylinder to the atmosphere. In the first position of the cock, the large passage $w$ connects the auxiliary air chamber to the brake cylinder (passenger trains); in the second position narrow passage $w^1$ connects this chamber to the brake cylinder (goods trains); in the third position the plug $H^3$ cuts off the auxiliary air container from the brake cylinder, and the latter is connected by passages $y$ and $w$ of cock $H^3$ to the atmosphere.

For proportional braking of trucks with different loads, in accordance with the aggregate load of the train, Fig. 3 shows in addition to the usual movable abutment or stop a movable sleeve 11, with an unloaded spring $f^3$. The movable stop $m$ is only required in case the pressure in the main is unnecessarily reduced. In that case, if there were no fixed abutment, $m$, the piston K on lightly loaded trucks would move farther than required, and the brake effect would be excessive. Fig. 3 shows the valve set for maximum brake effect, where the spring $f^3$ does not come into action. If the lever 17 is set, for example, for half-load, the sleeve $m$ moves upwards to the position shown by broken lines, and at the same time the sleeve 11 and spring $f^3$ are moved. The gears are so proportioned that the spring $f^3$ is in front of the sleeve $m$. When the brake is applied the collar $t$ on piston rod $d$ gradually compresses the spring $f^3$, so that the piston K moves more slowly than at full load and moves through the shortened distance to the abutment $m$ in the same time as the piston on a fully loaded truck moves through the longer distance. The same applies to release of the brake by increasing the pressure in the main pipe. The lever 17 may be actuable by means of links or rods on both sides, from front and rear, the rods being, for example, connected to cranks at the ends of the vehicle. This lever may, also, be adjusted automatically by the loading of the vehicle, as for example by utilizing for that purpose the bending of the springs.

What I claim as my invention and desire to secure by Letters Patent of the United States is:—

1. In a controlling valve for pneumatic brakes for railway vehicles and the like, an automatic slidable valve member, a chamber or conduit connected to the train pipe and by the pressure in which said valve member is controlled so that said valve member is caused to open a supply port to the brake cylinder when said pressure is reduced and said valve member is caused to be restored to closing position by the rising pressure in the brake cylinder, means for limiting the movement of the member controlled by the air pressure, and means for adjustment of the said means for limiting the movement so that the time required for the shorter movement may be substantially equal to the time required for the longer movement.

2. In a controlling valve for pneumatic brakes for railway vehicles and the like, an automatic slidable valve member, a chamber or conduit connected to the train pipe and by the pressure in which said valve member is controlled so that said valve member is caused to open a supply port to the brake cylinder when said pressure is reduced and said valve member is caused to be restored to closing position by rising pressure in the brake cylinder, means for limiting the movement of the member controlled by the air pressure means for automatically adjusting the said means for limiting the movement according to the load of the vehicle.

3. In a controlling valve for pneumatic brakes for railway vehicles and the like, an automatic slidable valve member, a chamber or conduit connected to the train pipe and by the pressure in which said valve member is controlled, so that said valve member is caused to open a supply port to the brake cylinder when said pressure is reduced and said valve member is caused to be restored to closing position by the rising pressure in the brake cylinder, means for limiting the movement of the member controlled by the air pressure, means for adjustment of the said means for limiting the movement so that the time required for the shorter movement may be substantially equal to the time required for the longer movement, and means whereby the said valve member in the course of its opening movement temporarily opens communication from the train pipe to a supplementary chamber or the brake cylinder or the atmosphere.

4. In a controlling valve for pneumatic brakes for railway vehicles and the like, an automatic slidable valve member, a chamber or conduit connected to the train pipe and by the pressure in which said valve member is controlled so that said valve member is caused to open a supply port to the brake cylinder when said pressure is reduced and said valve member is caused to be restored to closing position by the rising pressure in the brake cylinder, means for limiting the movement of the member controlled by the air pressure, means for adjustment of the said means for limiting the movement so that the time required for the shorter movement may be substantially equal to the time required for the longer movement, means whereby the said valve member in the course of its opening movement temporarily opens communication from the train pipe to a supplementary chamber or the brake cylinder or the atmosphere, and means for regulating the size of the passage so that the opening is small when the valve is actuated for normal application of the brake and large when the valve is actuated for rapid or emergency brake action.

5. In a controlling valve for pneumatic brakes for railway vehicles and the like, an automatic slidable valve member, a chamber or conduit connected to the train pipe and by the pressure in which said valve member is controlled, so that said valve member is caused to open a supply port to the brake cylinder when said pressure is reduced and cylinder when said pressure is caused to be restored to closing position by the rising pressure in the brake cylinder, means for limiting the movement of the member controlled by the air pressure, means for adjustment of the said means for limiting the movement so that the time required for the shorter movement may be substantially equal to the time required for the longer movement, means whereby the said valve member in the course of its opening movement temporarily opens communication from the train pipe to a supplementary chamber or the brake cylinder or the atmosphere, and means for manually regulating the passage from the train pipe temporarily opened by the valve member.

6. In a controlling valve for pneumatic brakes for railway vehicles and the like, an automatic slidable valve member, a chamber or conduit connected to the train pipe and by the pressure in which said valve member is controlled, so that said valve member is caused to open a supply port to the brake cylinder when said pressure is reduced and said valve member is caused to be restored to closing position by the rising pressure in the brake cylinder, means for limiting the movement of the member controlled by the air pressure, means for adjustment of the said means for limiting the movement so that the time required for the shorter movement may be substantially equal to the time required for the longer movement, means whereby the said valve member in the course of its opening movement temporarily opens communication from the train pipe to a supplementary chamber or the brake cylinder or the atmosphere, and means adapted to control a port for the supply of air from an auxiliary air reservoir to the brake cylinder, the said supply being regulatable by means of a cock having alternative passages of different sizes.

7. In a controlling valve for pneumatic brakes for railway vehicles and the like, an automatic slidable valve member, a chamber or conduit connected to the train pipe and by the pressure in which said valve member is controlled, so that said valve member is caused to open a supply port to the brake cylinder when said pressure is reduced and said valve member is caused to be restored to closing position by the rising pressure in the brake cylinder, means for limiting the movement of the member controlled by the air pressure means for adjustment of the said means for limiting the movement so that the time required for the shorter movement may be substantially equal to the time required for the longer movement, means whereby the said valve member in the course of its opening movement temporarily opens communication from the train pipe to a supplementary chamber or the brake cylinder or the atmosphere, a slidable member for controlling a port for the supply of air from an auxiliary air reservoir to the brake cylinder, and a cock whereby the said supply can be cut off, the brake cylinder being at the same time placed in communication with the atmosphere.

In witness whereof I have signed this specification in the presence of two witnesses.

IVAR DROLSHAMMER.

Witnesses:
L. E. MARTINS,
A. MESS.